(12) United States Patent
Albayrak et al.

(10) Patent No.: US 12,204,382 B2
(45) Date of Patent: Jan. 21, 2025

(54) FRAME FOR AN ELECTRO-OPTICAL DISPLAY AND ELECTRO-OPTICAL DISPLAY HAVING A FRAME

(71) Applicant: Continental Automotive GmbH, Hannover (DE)

(72) Inventors: Gökay Albayrak, Neuberg (DE); Florian Haas, Seligenstadt (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/769,119

(22) PCT Filed: Sep. 28, 2020

(86) PCT No.: PCT/EP2020/077104
§ 371 (c)(1),
(2) Date: Apr. 14, 2022

(87) PCT Pub. No.: WO2021/073856
PCT Pub. Date: Apr. 22, 2021

(65) Prior Publication Data
US 2024/0103589 A1    Mar. 28, 2024

(30) Foreign Application Priority Data
Oct. 15, 2019 (DE) .................. 10 2019 215 868.4

(51) Int. Cl.
G06F 1/16 (2006.01)
B29C 45/00 (2006.01)
G06F 1/18 (2006.01)

(52) U.S. Cl.
CPC .......... *G06F 1/182* (2013.01); *B29C 45/0001* (2013.01); *B29K 2995/0046* (2013.01)

(58) Field of Classification Search
CPC ...... G06F 1/182; G06F 1/1601; G06F 1/1607; G06F 1/1613; G06F 1/1624;
(Continued)

(56) References Cited

U.S. PATENT DOCUMENTS

2003/0046849 A1* 3/2003 Lin .................. F16M 11/041
                                                        40/792
2008/0007669 A1* 1/2008 Chi .................. G02F 1/133608
                                                        349/58
(Continued)

FOREIGN PATENT DOCUMENTS

DE    202014103159 U1    9/2014
DE    112012006575 T5    4/2015
(Continued)

OTHER PUBLICATIONS

Search Report dated Apr. 14, 2020 from corresponding German patent application No. 10 2019 215 868.4.
(Continued)

*Primary Examiner* — Anthony Q Edwards

(57) ABSTRACT

A frame for electro-optical displays comprising rigid elements in a longitudinal direction, wherein the longitudinal direction is parallel to a surface of the electro-optical display is provided. Elastic elements in the longitudinal direction are arranged between the rigid elements in the longitudinal direction. An electro-optical display having a frame is also provided.

12 Claims, 3 Drawing Sheets

(58) Field of Classification Search
CPC .... G06F 1/1633; G06F 1/1637; G06F 1/1656; G06F 1/1675; G02F 1/133305; G02F 1/133317; G02F 1/133328
See application file for complete search history.

(56) References Cited

U.S. PATENT DOCUMENTS

| | | |
|---|---|---|
| 2008/0151579 A1 | 6/2008 | Kim |
| 2011/0002112 A1* | 1/2011 | Hsu ................... G02F 1/133308 361/829 |
| 2015/0309354 A1 | 10/2015 | Li |
| 2016/0014914 A1 | 1/2016 | Stroetmann |
| 2016/0116944 A1 | 4/2016 | Lee et al. |
| 2016/0299532 A1 | 10/2016 | Gheorghiu et al. |
| 2017/0047959 A1 | 2/2017 | Cater et al. |
| 2019/0179193 A1* | 6/2019 | Kang ................. G02F 1/133308 |
| 2019/0293988 A1* | 9/2019 | Krieger ............. G02F 1/133308 |

FOREIGN PATENT DOCUMENTS

| | | |
|---|---|---|
| DE | 112012007216 T5 | 9/2015 |
| DE | 202017102018 U1 | 5/2017 |
| JP | 2008112663 A | 5/2008 |
| KR | 20080057875 A | 6/2008 |
| KR | 20170093781 A | 8/2017 |

OTHER PUBLICATIONS

International Search Report and Written Opinion dated Dec. 3, 2020 from corresponding International patent application No. PCT/EP2020/077104.

Notice of Allowance dated Sep. 26, 2023 from corresponding Korean patent application No. 10-2022-7009398.

* cited by examiner

FRAME FOR AN ELECTRO-OPTICAL DISPLAY AND ELECTRO-OPTICAL DISPLAY HAVING A FRAME

CROSS REFERENCE TO RELATED APPLICATIONS

This U.S. patent application claims the benefit of PCT patent application No. PCT/EP2020/077104, filed Sep. 28, 2020, which claims the benefit of German patent application No. 10 2019 215 868.4, filed Oct. 15, 2019, both of which are hereby incorporated by reference.

TECHNICAL FIELD

The disclosure relates to a frame for an electro-optical display and to an electro-optical display having a frame.

BACKGROUND

Previous electro-optical displays disclose frames for electro-optical displays which have elements that are rigid in a longitudinal direction parallel to the surface of the electro-optical display. Here, a surface is taken to mean the largest extent of the surface of the display, on which the information that can be ascertained by an observer of the display is also displayed. A clear distinction must be made between this and the side faces of the electro-optical display.

It is customary for the frame to be rigidly connected, e.g. adhesively bonded, to the surface of the electro-optical display. If the electro-optical display and the frame have different coefficients of thermal expansion, the adhesive joint may break in the event of sharp changes in temperature.

SUMMARY

It is therefore the object of the present disclosure to specify a frame with which breaking of the joints can be prevented. This object is achieved in that elements that are elastic in the longitudinal direction are arranged between the elements that are rigid in the longitudinal direction. This ensures that the action of forces on the joints is less severe and thus breaking of the joint can be prevented. This configuration also has advantages for a frame for an electro-optical display if the frame is not adhesively bonded to the electro-optical display but, for example, a special configuration of the frame involves pressing the display into the frame, thus making it possible to dispense with an adhesive joint. Thus, it is then possible, when assembling the frame with the display for example, to briefly stretch the frame and then push parts of the frame over the edges of the display.

In an embodiment, the elastic elements are composed of the same material as the elements that are rigid in the longitudinal direction. The frame is particularly simple to produce.

In an embodiment, the elastic elements have a shape which is wavy or meandering in longitudinal section. It is possible in a simple manner to obtain an element that is elastic in the longitudinal direction.

This is achieved in a particularly simple manner if the elements that are rigid in the longitudinal direction are produced in one piece with the elements that are elastic in the longitudinal direction. This is then achieved in a particularly simple manner if the frame is injection-molded in one piece.

In an embodiment, the frame is composed of plastic. It is possible, on the one hand, for said frame to be injection-molded in a simple manner and, on the other hand, to achieve the elasticity of a wavy or meandering configuration of the elastic elements. The elastic elements may also be configured in a spiral shape, for example. However, the production thereof is then more complicated than in the case of a wavy or meandering configuration.

In an embodiment, the frame has bearing surfaces for the electro-optical display. The frame may simply be adhesively bonded to the electro-optical display.

In an embodiment, the frame has clasps, which fit around the electro-optical display perpendicularly to the surface of the electro-optical display at the edges of the electro-optical display. The electro-optical display may be fully held by these clasps, and it may be possible to dispense with adhesive bonding between the display and the frame. The clasps fit around the display in outer regions of the display. Thus, the electro-optical display may be held in the frame and does not necessarily have to be adhesively bonded to the frame in addition. In cross section, the clasp may be of U-shaped or V-shaped configuration, for example. In the case of a V-shaped configuration of the clasp, the display rests by its edges on the legs of the clasp of V-shaped cross section.

An electro-optical display having a frame can be obtained with a frame in accordance with the above description. In this case, the electro-optical display can be adhesively bonded to the frame. If the frame has clasps which grip the display perpendicularly to the surface of the display, it may be possible to dispense with adhesive bonding of the frame to the display since the electro-optical display is in fact already fully held in the frame in this way.

BRIEF DESCRIPTION OF THE DRAWINGS

The present disclosure will become more fully explained in the detailed description and the accompanying drawings, wherein.

DETAILED DESCRIPTION

Figure 1:
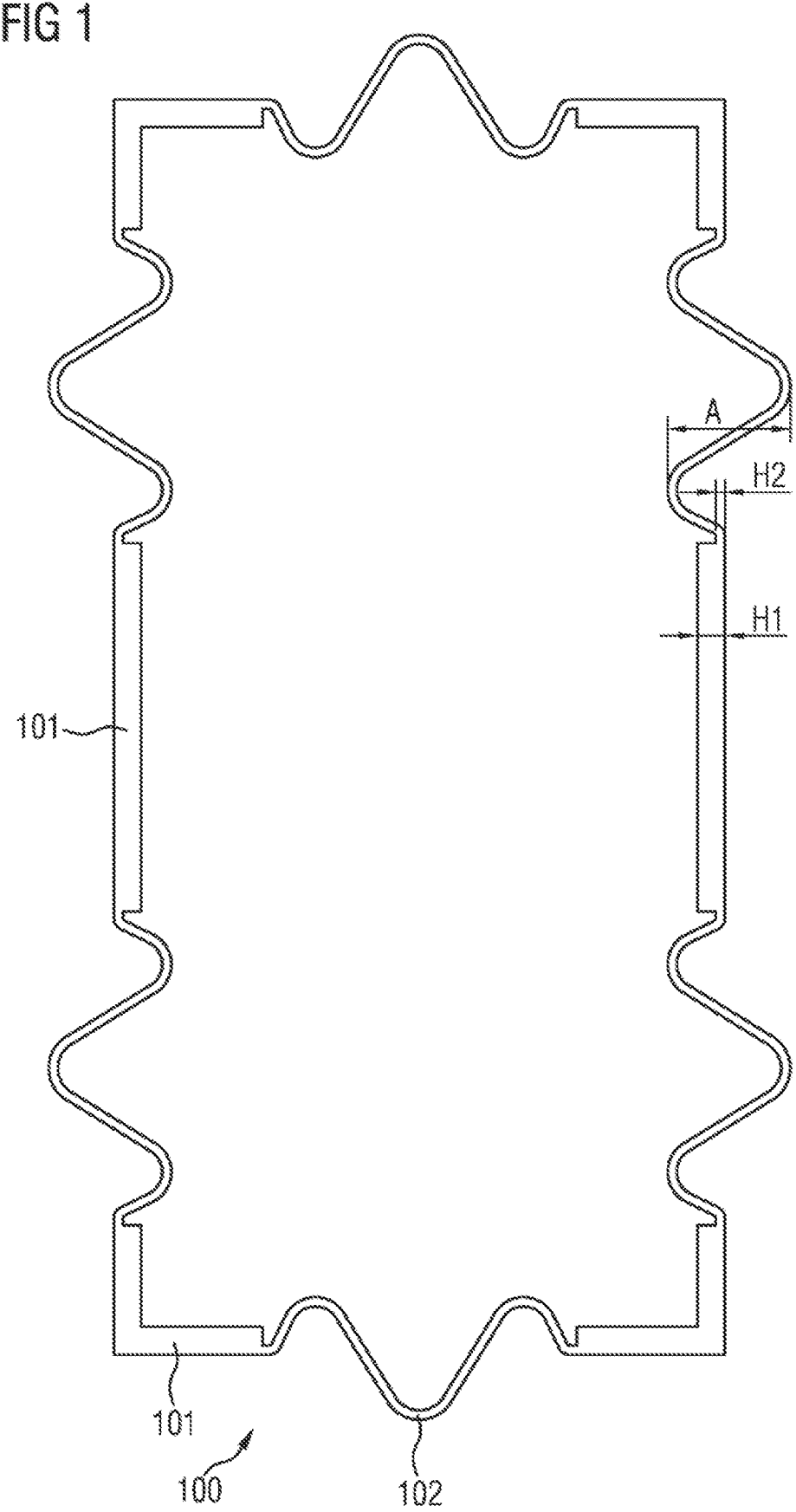
FIG. 1 shows the plan view of a frame of an embodiment.

FIG. 1 shows a frame 100 having rigid elements 101 and elastic elements 102. In an embodiment, the frame 100 is molded in one piece from plastic. In an embodiment, the elastic elements 102 are of wavy configuration. This makes it possible for the frame 100 to be compressed or extended parallel to the rigid elements 101 without the possibility of a force on an electro-optical display (not illustrated) situated in the frame becoming excessively great and without the possibility of a potential adhesive joint between the frame and the electro-optical display breaking. The elastic elements 102 may also be configured in a meandering shape, for example. In the exemplary embodiment in FIG. 1, the rigid elements have a width H1, while the elastic elements have a width H2 which is less than the width H1. This increases the elasticity of the elastic elements 102. In the example, an illustrated amplitude A of the wavy configuration of the elastic elements 102 is greater than the width H1. This illustration is used to make it easier to see the mode of operation of the elastic elements 102. In an embodiment, the amplitude A may also correspond to the width H1 or may even have some other value.

It can furthermore be seen that the wavy configuration of the elastic element 102 has a different width H2 than the width H1 of the rigid element 101.

In the embodiment illustrated, this further increases the elasticity of the elastic element 102. However, it is also possible for the width H2 of the elastic elements 102 to be the same as or greater than the width H1 of the rigid elements 101.

Figure 2:
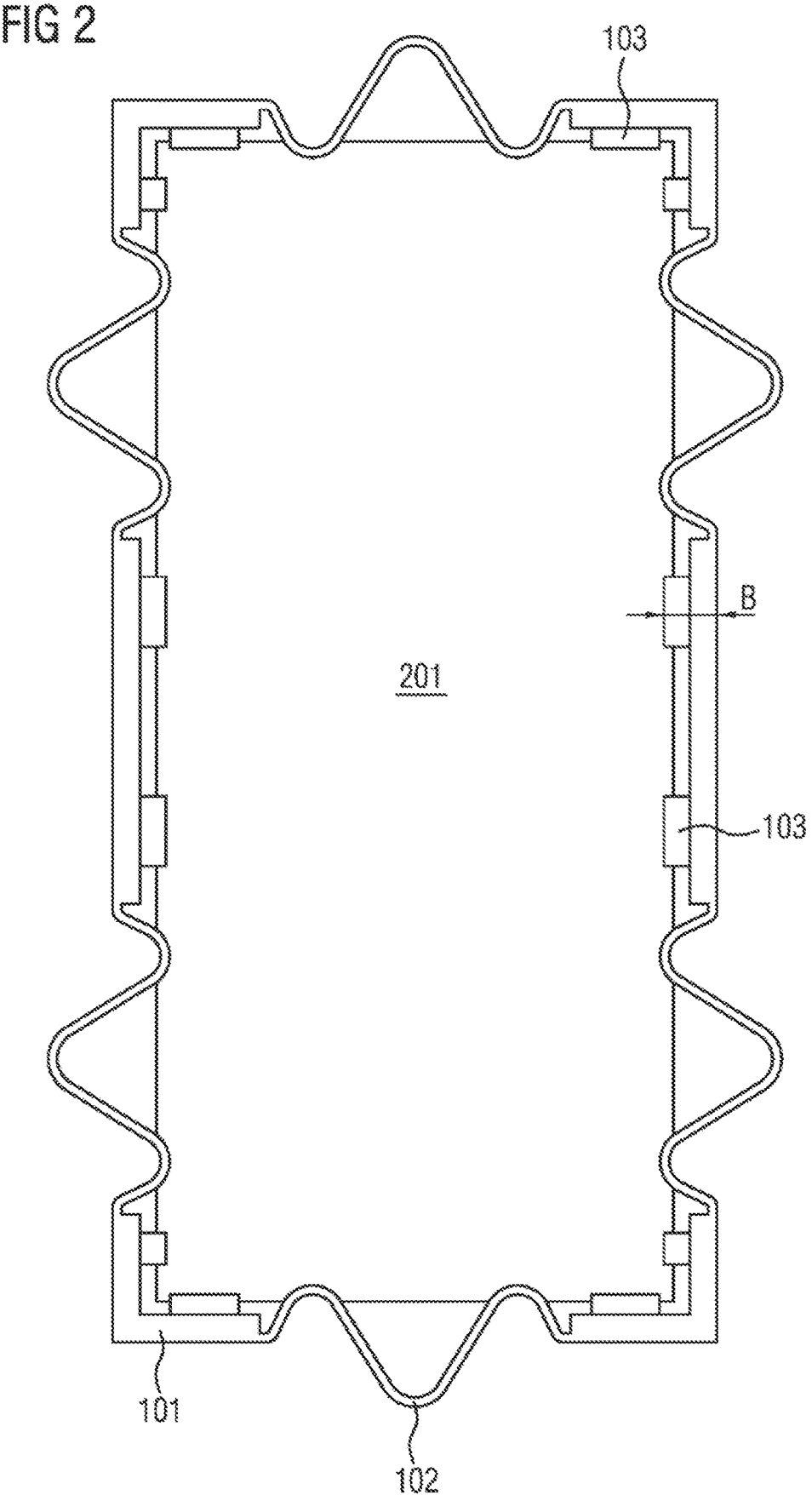
FIG. 2 shows the plan view of a frame of an embodiment with an electro-optical display.

FIG. 2 shows the frame 100 and the surface 201 of the electro-optical display 200, which is otherwise not illustrated. As compared with the frame 100 from FIG. 1, the frame 100 additionally has clasps 103, which fit partially around the electro-optical display 200 at its edges, perpendicularly to the surface 201 of said display. For assembly, the frame 100 can be stretched until the electro-optical display 200 can be placed between the clasps 103, and, as the frame 100 relaxes, the clasps 103 fit around the electro-optical display 200 on the sides thereof, as illustrated in FIG. 2.

Figure 3:
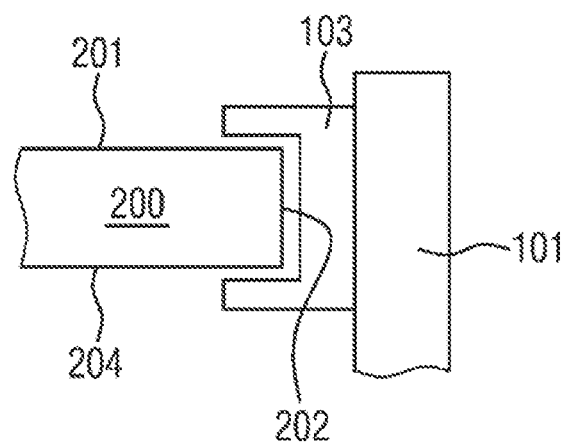
FIG. 3 shows section BB from FIG. 2.

One possible configuration of this clasp is shown by FIG. 3. It can be seen in FIG. 3 that the display 201 furthermore has a side face 202 and a bottom surface 204. The clasp 103 fits around the display 200 in an outer region of the surface 201 and of the bottom surface 204 and in the region of the side face 202. In this way, the electro-optical display 200 is held in the frame 100 and does not necessarily have to be additionally adhesively bonded to the frame 100. In this arrangement, the display 200 can be pressed into the clasp or, as illustrated in FIG. 3, can have a certain play. In the case of a V-shaped configuration (not illustrated) of the clasp, the display 200 rests by its edges on the legs of the clasp, which is V-shaped in cross section, the edges being those between the surface 201 and the side face 202 and those between the side face 202 and the bottom surface 204.

Figure 4:
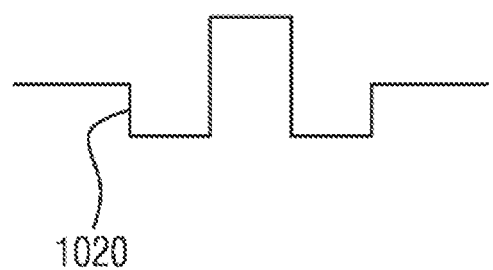
FIG. 4 shows a first possible meandering configuration of an elastic element.

FIG. 4 shows a first meandering configuration 1020 of the elastic element 102.

Figure 5:
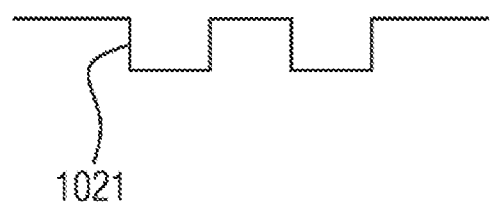
FIG. 5 shows a second possible meandering configuration of an elastic element.

FIG. 5 shows a second meandering configuration 1021 of the elastic element 102.

The invention claimed is:

1. A frame for electro-optical displays, comprising:
   rigid elements in a longitudinal direction, wherein the longitudinal direction is parallel to a surface of the electro-optical display;
   elastic elements in the longitudinal direction, wherein the elastic elements are arranged between the rigid elements in the longitudinal direction; and
   clasps, which fit around the electro-optical display perpendicularly to the surface of the electro-optical display in a region of edges of the electro-optical display.

2. The frame as claimed in claim 1, wherein the elastic elements in the longitudinal direction comprise the same material as the rigid elements in the longitudinal direction.

3. The frame as claimed in claim 1, wherein the elastic elements in the longitudinal direction have a wavy or meandering shape.

4. The frame as claimed in claim 1, wherein the rigid elements in the longitudinal direction are produced in one piece with the elastic elements in the longitudinal direction.

5. The frame as claimed in claim 1, wherein the frame comprises plastic.

6. The frame as claimed in claim 5, wherein the frame is injection-molded.

7. The frame as claimed in claim 1, wherein the frame further comprises bearing surfaces for the electro-optical display.

8. The frame as claimed in claim 7, wherein the electro-optical display is connected to the bearing surfaces.

9. The frame as claimed in claim 7, wherein the electro-optical display is connected to the bearing surfaces.

10. The frame as claimed in claim 7, wherein the electro-optical display is adhesively bonded to the bearing surfaces.

11. An electro-optical display having a frame, the frame comprising:
    rigid elements in a longitudinal direction, wherein the longitudinal direction is parallel to the surface of the electro-optical display;
    elastic elements in the longitudinal direction, wherein the elastic elements are arranged between the rigid elements in the longitudinal direction;
    bearing surfaces for the electro-optical display; and
    clasps, which fit around the electro-optical display perpendicularly to the surface of the electro-optical display in a region of edges of the electro-optical display, wherein the electro-optical display is adhesively bonded to the bearing surfaces.

12. A frame for electro-optical displays, comprising:
    rigid elements in a longitudinal direction, wherein the longitudinal direction is parallel to a surface of the electro-optical display;
    elastic elements in the longitudinal direction, wherein the elastic elements are arranged between the rigid elements in the longitudinal direction; and
    bearing surfaces for the electro-optical display, wherein the electro-optical display is adhesively bonded to the bearing surfaces.

\* \* \* \* \*